United States Patent [19]

Caspar et al.

[11] Patent Number: 4,655,336

[45] Date of Patent: Apr. 7, 1987

[54] CLUTCH DISC

[75] Inventors: Manfred Caspar, Oberwerrn; Franz Hartig, Dittelbrunn; Dagwin Tomm, Kaiserslautern, all of Fed. Rep. of Germany

[73] Assignee: Fichtel & Sachs AG, Fed. Rep. of Germany

[21] Appl. No.: 712,369

[22] Filed: Mar. 15, 1985

[30] Foreign Application Priority Data

Mar. 17, 1984 [DE]  Fed. Rep. of Germany ....... 3409868

[51] Int. Cl.⁴ ............................. F16D 3/14; F16D 3/66
[52] U.S. Cl. ................................ 192/106.2; 192/106.1; 192/110 R
[58] Field of Search ............. 192/106.2, 106.1, 110 R, 192/70.17; 464/66, 68

[56] References Cited

U.S. PATENT DOCUMENTS

| | | | |
|---|---|---|---|
| 4,234,068 | 11/1980 | LeBrise | 192/106.2 |
| 4,485,907 | 12/1984 | Nishimura | 192/106.2 |
| 4,548,309 | 10/1985 | Braun | 192/106.2 |

FOREIGN PATENT DOCUMENTS 688630  2/1940  Fed. Rep. of Germany .

*Primary Examiner*—Rodney H. Bonck
*Assistant Examiner*—Richard M. Lorence
*Attorney, Agent, or Firm*—Toren, McGeady and Goldberg

[57] ABSTRACT

The clutch disc for a motor vehicle friction clutch comprises a friction damper with friction linings resiliently braced in axially between disc parts. The friction linings have surface regions with different coefficients of friction which can be brought into operative engagement according to choice by control means for the adjustment of the friction torque of the friction damper. In this way the friction torque can be adjusted for the compensation of construction tolerances of the clutch disc, without variation of the spring stress of the friction damper.

11 Claims, 6 Drawing Figures

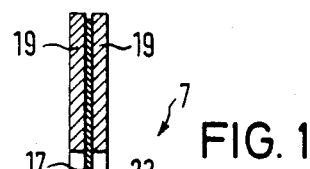
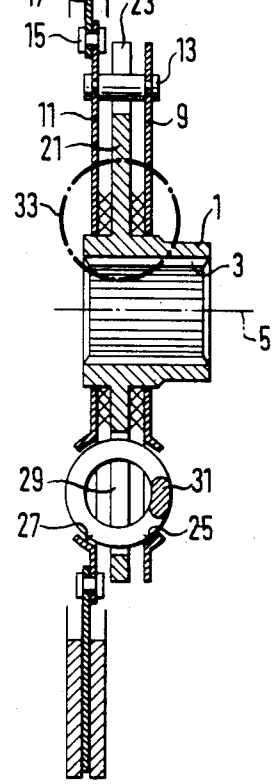
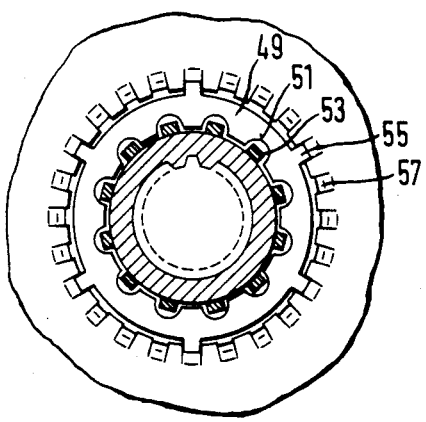
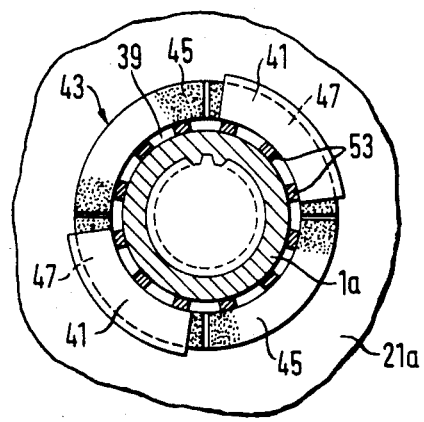

CLUTCH DISC

BACKGROUND OF THE INVENTION

The invention relates to a clutch disc for a motor vehicle friction clutch which comprises a torsional vibration spring damper and a torsional vibration friction damper.

STATEMENT OF PRIOR ART

A clutch disc for a motor vehicle friction clutch is known from Fed. German Patent No. 688,630, on the hub of which a friction lining carrier is mounted rotatably through a limited angle of rotation. A spring coupling or damper is arranged in the torque transmission path between the hub and the friction lining carrier. The known clutch disc further comprises a torsional vibration friction damper having a plurality of mutually independently adjustable friction units. Each of the friction units comprises friction discs resting externally on a disc of the friction lining carrier which are seated in openings of side discs of the hub arranged axially on both sides of the friction lining carrier disc. A likewise externally arranged helical compression spring braces the friction discs towards one another. The stress force of each spring is adjustable by means of a clamp bolt, passing axially through the clutch disc, and of a nut. The friction damper of the known clutch disc is unprotected, so that the friction torque can vary in operation. Furthermore, it is difficult to check whether the friction units are uniformly adjusted. Friction units set to excessively high spring stress wear prematurely, shortening the life of the clutch disc. Finally, the overall axial height of the clutch disc is relatively great.

OBJECT OF THE INVENTION

It is an object of the invention to provide a clutch disc for a motor vehicle friction clutch, the torsional vibration friction damper of which can be adjusted to predetermined friction torque values without variation of its spring stress.

SUMMARY OF THE INVENTION

According to the invention, there is provided a clutch disc for a motor vehicle friction clutch, comprising a hub, a friction lining carrier mounted on the hub rotatably through a limited angle of rotation in relation to the hub about its axis of rotation, a torsional vibration spring damper or spring coupling arranged in the torque transmission path between hub and friction lining carrier, and at least one torsional vibration friction damper with friction material axially resiliently braced in between disc parts, said friction material having at least two friction face regions with different coefficients of friction and control means by means of which the friction face regions are placed selectively into a friction-damping operative connection with the disc parts.

The invention is based upon the principle, for the adjustment of the friction torque, of not varying the spring stress of the friction damper but, with a predetermined spring stress, of bringing friction materials with different coefficients of friction into operative connection with the disc parts of the friction damper which are initially stressed axially towards one another by the spring stress.

In a first preferred embodiment it is provided that one of the disc parts, associated in pairs with one another, carries at least two friction linings, arranged side by side in the friction surface direction, with different coefficients of friction. The other disc part of the pair is adjustable in relation to the hub connected non-rotatably with it or in relation to the friction lining carrier connected non-rotatably with it, in the friction surface direction between a position substantially overlapping the first friction lining and a position substantially overlapping the second friction lining. In this case the axial distance between the two disc parts is not changed, so that the spring stress retains the value predetermined by the axial dimensions of the clutch disc.

The friction linings can be arranged radially side by side if one of the disc parts is radially adjustable. However, embodiments can be made constructively more simple if the friction linings are arranged side by side in the circumferential direction of one of the disc parts and the other disc part is formed as a segmented disc. For the adjustment, one of the disc parts is rotated about the axis of rotation in relation to the hub connected non-rotatably with it or to the friction lining carrier.

The friction linings have segment form, in conformity with the segments of the segmented disc, and are arranged in the circumferential direction preferably in several like groups of at least two friction linings with coefficients of friction succeeding one another in constant sequence. One segment of the segmented disc is allocated to each of the groups. In this way the axial pressure of the stressing spring of the friction damper can be distributed uniformly in the circumferential direction.

The friction linings expediently have equal angular width in the circumferential direction. The angular width of each segment of the segmented disc is expediently less than the angular width of the friction lining segments. Thus, within the range of relative angle of rotation of hub and friction lining carrier it is possible to avoid the segments overlapping two or more friction linings with different coefficients of friction and the friction torque varying in dependence upon rotation angle.

On the other hand adjustment positions in which each segment of the segmented disc overlaps two or more friction lining segments permit a steady or finely staged adjustment of the friction torque. By variation of the area ratio of the areas of neighboring friction linings overlapped by each segment in common, it is possible to set mean values of the coefficients of friction. Provided that no rotation-angle-dependent variation of the friction torque is desired, by graduation of the friction coefficients of neighboring friction linings it is possible to keep the friction torque variation small and thus within permissible tolerance values.

In a second preferred embodiment it is provided that axially between the disc parts of each disc part pair, there is arranged a friction ring rotatable about the axis of rotation in relation to both disc parts. The coefficient of friction of the ring is of different magnitudes on axially opposite friction faces. The friction ring is optionally couplable non-rotatably with the disc part resting on the friction face side of the lower coefficient of friction. When the friction ring is uncoupled, the friction ring is entrained by the disc part arranged on the side of the greater coefficient of friction and the friction torque is determined by the lower coefficient of friction. When the friction ring is coupled, the friction torque is fixed by the greater coefficient of friction. The stress force of the stressing spring is not varied in this case.

The optional coupling of the friction ring nonrotatably with the disc part arranged on the side of its lower coefficient of friction can be achieved in many ways. By way of example, the friction ring can be connected with the disc part directly or indirectly through a part of the clutch disc which in turn is connected non-rotatably with this disc part. The friction ring can be secured directly or, however, for its part can be secured to a carrier part which forms part of the clutch. The coupling can take place detachably, but also permanently, for example by adhesion or swaging.

In a preferred embodiment it is provided that the disc part resting on the friction face side of the lower coefficient of friction carries at least one bent tab engageable into coupling contact with the friction ring. The bent tab can carry detent teeth or the like which are pressed into the friction lining, or detent openings can be provided in the friction lining, into which the bent tab is bent. The bent tabs are expediently formed on or punched out of the externally accessible side disc of the friction lining carrier of the clutch disc. The bent tabs can however also be formed on an additional thrust ring or the like guided non-rotatably but axially displaceably on the side disc. The side disc then expediently contains passage openings by way of which the bent tab is axially accessible from the exterior.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF DRAWINGS

In the drawings:

FIG 1 shows an axial longitudinal section through a clutch disc with a torsional vibration spring damper and an adjustable torsional vibration friction damper for a motor vehicle friction clutch;

FIG. 2 shows an axial longitudinal section through a first embodiment of a friction damper with friction torque adjustable by steps, usable in the clutch disc according to FIG. 1;

FIG. 3 shows an axial cross-section through the friction damper, seen along a line III—III in FIG. 2;

FIG. 4 shows an axial cross-section through the friction damper, seen along a line IV—IV in FIG. 2;

DESCRIPTION OF PREFERRED EMBODIMENTS

Figure 5:
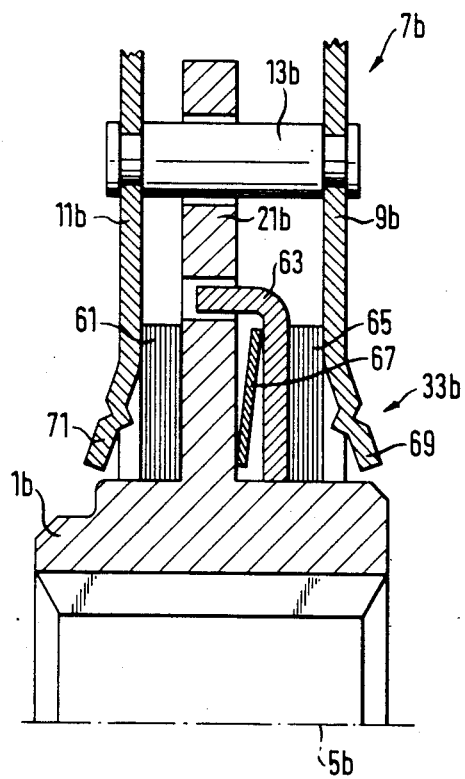
FIG. 5 shows an axial longitudinal section through a second embodiment of a friction damper adjustable by steps, usable in the clutch disc according to FIG. 1.

FIG. 1 shows the fundamental assembly of a clutch disc for a motor vehicle friction clutch. The clutch disc comprises a hub 1 of substantially sleeve form which is couplable non-rotatably but axially displaceably through its internal toothing 3 with an input shaft (not shown further) of a motor vehicle gear. The input shaft is rotatable about a rotation axis 5. A friction lining carrier 7 is mounted rotatably through a limited angle of rotation about the rotation axis 5 on the hub 1. The friction lining carrier 7 comprises two side discs 9, 11 formed as sheet metal shaped pieces of substantially annular disc form which are firmly connected with one another with axial spacing from one another by means of distance rivets 13 or the like. A driver disc 17, likewise of annular disc form, is secured with rivets 15 to the external circumference of the side disc 11, and in turn carries clutch friction linings 19 on both axial sides. A hub flange 21 of disc form protruding substantially radially from the hub 1 extends axially between the side discs 9, 11. The distance rivets 13 pass through apertures 23 on the circumference of the hub flange 21 and limit the angle of rotation of the friction lining carrier 7 in relation to the hub 1.

In the side discs 9, 11 and in the hub flange 21, there are provided windows 25, 27 and 29 respectively which are substantially axially aligned with one another when the clutch disc is in the rest position and in which helical compression springs 31 are seated. The helical compression springs 31 are subjected to compression stress in the relative rotation of the friction lining carrier 7 and the hub 1, and form a torsional vibration spring damper for coupling. FIG. 1 shows only one of several helical compression springs 31 arranged in distribution in the circumferential direction.

An adjustable torsional vibration friction damper, explained in greater detail below in various embodiments, is indicated at 33 in FIG. 1. The friction torque of the friction damper 33 is adjustable, in order that component tolerances of the clutch disc may be compensated, with the clutch disc assembled without variation of the stress force of its stressing spring. For this purpose the friction damper 33 comprises friction linings or the like having optionally effective friction face regions with different coefficients of friction.

In the following explanation of different embodiments of friction dampers, components which have been explained by reference to the clutch disc in FIG. 1 are designated with the same reference numerals and additionally by a letter. For more detailed explanation of the components designated by the same reference numbers, reference is made to the description of FIG. 1.

FIGS. 2 to 4 show a friction damper 33a, the friction torque of which is adjustable, when the clutch disc is assembled, by variation of the effective coefficient of friction. The friction lining carrier 7a is guided rotatably but axially movably on the hub 1a by means of its side disc 11a. The side disc 9a, which is connected into one unit with the side disc 11a by distance rivets 13a, forms an annular gap 35 between its internal circumference and the hub 1a.

A friction ring 37 enclosing the hub 1a is seated axially between the side disc 11a and the hub flange 21a of the hub 1a. The friction ring 37 is in frictional contact with at least one of these parts. A segmented disc 39 annularly surrounding the hub 1a is arranged axially between the hub flange 21a and the other side disc 9a. The segmented disc 39, as shown best by FIG. 4, carries two thrust disc segments 41 protruding radially oppositely to one another diametrically of the rotation axis 5a. A friction ring 43 is arranged axially between the segmented disc 39 and the hub flange 21a. The friction ring 43 is secured to the hub flange 21a and consists of two pairs of friction lining segments 45 and 47, the friction faces of which lie in the same plane perpendicular to the axis. Friction lining segments 45 and 47 adjacent in the circumferential direction consist of materials with different coefficients of friction. The friction lining segments lying diametrically opposite to one another in relation to the rotation axis 5a have equal coefficients of friction. While the friction lining segments 45 and 47 each have an angular width of about 90°, the angular width of the thrust disc segments 41 is smaller than 90° by the maximum relative angle of rotation of the friction lining carrier 7a and the hub 1a.

On the side axially remote from the friction ring 43, a dished spring 49 surrounding the hub 1a is braced in between the segmented disc 39 and the side disc 9a. The dished spring 49 is provided with cut-away portions 51 (FIG. 3) on its internal circumference, in which there engage tongues 53 protruding axially to the side disc 9a from the internal circumference of the segmented disc 39, which couple the segmented disc 39 non-rotatably but axially movably with the dished spring 49. On the external circumference of the dished spring 49 several tongues 55 arranged with spacing from one another in the circumferential direction protrude substantially radially. The tongues 55 engage in apertures or depressions 57 of the side disc 9a. In this way the dished spring 49 guides the segmented disc 39 non-rotatably but axially displaceably on the side disc 9a.

In order that the angular position of the segmented disc 39 may be varied in relation to the side disc 9a, a plurality of depressions 57 staggered in relation to one another in the circumferential direction is provided on the side disc 9a. By means of a tool indicated at 59 in FIG. 2, the tongues 55 of the dished spring 49 can be disengaged from the detaining engagement and the dished spring 49, including the segmented disc 39 connected non-rotatably with it, can be rotated about the rotation axis 5a in relation to the friction lining segments 45, 47. According to the ratio of the areas of the friction lining segments 45, 47 overlapped by the thrust disc segments 41, the friction torque of the friction damper 33a can be adjusted. Since the installation height of the dished spring 49 does not vary in the adjustment of the friction torque, its initial stress also does not change.

A similar friction damper, constructed using friction lining segments and a thrust ring of segmented form, can also be provided between the hub flange 21a and the other side disc 11a.

FIG. 5 shows another friction damper 33b which is adjustable as regards its friction torque without variation of its spring stress. The side discs 9b and 11b of the friction lining carrier 7b, firmly connected with one another through distance rivets 13b, are guided non-rotatably but axially displaceably on the hub 1b by means of one or both side discs 9b, 11b. A friction ring 61 is seated rotatably in relation to the side disc 11b and the hub flange 21b axially between the side disc 11b and the hub flange 21b. A thrust ring 63 is arranged axially between the hub flange 21b and the side disc 9b and a further friction ring 65 is arranged axially between the thrust ring 63 and the side disc 9b. The thrust ring 63 is guided non-rotatably but axially displaceably on the hub flange 21b. The friction ring 65 is rotatable both in relation to the thrust ring 63 and in relation to the side disc 9b and the hub axis 5b. A dished spring 67 is braced in axially between the thrust ring 63 and the hub flange 21b.

The friction rings 61 and 65 consist, on axially mutually opposite sides, of materials with different coefficients of friction. The friction ring 61 lies with its side of greater coefficient of friction against the hub flange 21b and with its side of lower coefficient of friction against the side disc 11b. The friction ring 65 lies with its side of greater coefficient of friction against the thrust ring 63 and with its side of lower coefficient of friction against the side disc 9b. As a result of this distribution of the coefficients of friction, the friction rings 61 and 65 rotate together with the hub flange 21b. In order that the friction torque may be adjusted, several bending tabs 69 and 71 respectively are formed on the side discs 9b and 11b in distribution in the circumferential direction. The bending tabs 69, 71 can be pressed into the friction rings 65 and 61 and in the pressed-in condition couple the friction rings 65, 61 non-rotatably with the side discs 9b and 11b. In the non-rotatably coupled condition, the friction rings 65, 61 rotate together with the friction lining carrier 7b and the friction torque is determined by the higher coefficient of friction of the friction rings 61, 65. The coefficient of friction can be changed over for one of the friction rings or for both friction rings in common.

Figure 6:
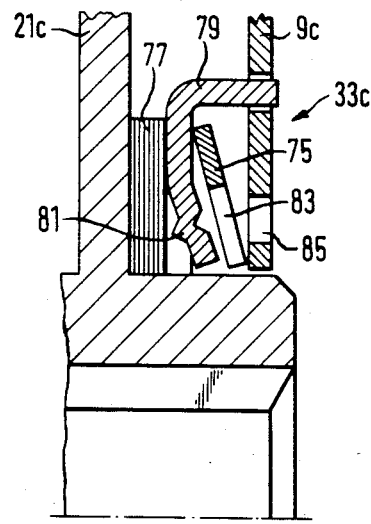
FIG. 6 shows a variant of the friction damper according to FIG. 5.

FIG. 6 shows a friction damper 33c which differs from the friction damper 33b according to FIG. 5 essentially only in that its dished spring 75 is arranged on the side axially remote from the hub flange 21c, of a friction ring 77 which is rotatable in relation to the hub flange 21c. Axially between the friction ring 77 and the dished spring 75, there is arranged a thrust ring 79 on which the dished spring, which is supported on one side on the side disc 9c, supports itself on the other side. The friction ring 77 is also rotatable in relation to the thrust ring 79 and consists, on axially opposite sides, of materials with different coefficients of friction. The friction ring 77 lies with its side of higher coefficient of friction on the hub flange 21c and with its side of lower coefficient of friction on the thrust ring 79. In order that the coefficient of friction may be changed over, several bending tabs 81 are arranged offset in the circumferential direction on the thrust ring 79. The friction ring, which rotates with the hub flange 21c when the tab 81 is bent away from the friction ring 77, can be coupled non-rotatably with the thrust ring 79 by means of the bending tabs 81, whereby the friction torque is changed over from the value determined by the low coefficient of friction to the value determined by the higher coefficient of friction.

In order that the bending tabs 81 can be deformed when the clutch disc is assembled, cut-away portions 83 are provided on the internal circumference of the dished spring 77 and piercings 85 are provided in the region of the internal circumference of the side disc 9c. The bending tabs 81 are accessible from axially outside by way of the cut-away portions 83 and the piercings 85.

While specific embodiments of the invention have been shown and described in detail to illustrate the application of the inventive principles, it will be understood that the invention may be embodied otherwise without departing from such principles.

We claim:

1. A clutch disc for a motor vehicle friction clutch, comprising:
   (a) a hub (1a);
   (b) a friction lining carrier (7a) mounted on the hub (1a) rotatably through a limited angle of rotation in relation to the hub (1a) about its axis of rotation (5a);
   (c) a resilient torsional coupling (31) arranged in a torque transmission path between hub (1a) and friction lining carrier (7a);
   (d) at least one torsional vibration friction damper (33a) including friction means (43), means (42) for bracing said friction means in the direction of the axis of rotation (5a) between disc parts, said friction means (43) having at least two friction face regions with different coefficients of friction, said bracing means providing a constant spring stress between said disc parts; and (e) selectively adjustable control means (41) for selectively engaging the friction face regions in a friction-damping operative connection with the disc parts without varying the constant spring stress provided by said bracing means (41).

2. A clutch disc according to claim 1, wherein said disc parts of said friction damper (33a) comprises at least one pair of disc parts (21a, 39) rotatable in relation to one another about the axis of rotation (5a) and constantly spring stressed axially resiliently towards one another, one (21a) of the pair of disc parts being connected non-rotatably with the hub (1a) and the other (39) of the pair of disc parts being connected non-rotatably with the friction lining carrier (7a), wherein said one (21a) of the disc parts of the pair carries at least two friction linings (45, 47) with different coefficients of friction separate from said friction lining carrier, serially arranged in the circumferential direction around the axis of rotation (5a), and the other disc part (39) of the pair is adjustable in relation to the hub (1a) or to the friction lining carrier (7a) connected non-rotatably with it between a position substantially overlapping a first friction lining (45) and a position substantially overlapping the second friction lining (47) of said at least two friction linings.

3. A clutch disc according to claim 2, wherein the friction linings (45, 47) are arranged on said one (21a) of the disc parts and wherein the other disc part (39) is formed as a segmented disc.

4. A clutch disc according to claim 3, wherein the friction linings (45, 47) are arranged in the circumferential direction in several equal groups of at least two friction linings with different coefficients of friction following one another in the circumferential direction in constant sequence and wherein one segment (41) of the segmented disc (39) is allocated to each group.

5. A clutch disc according to claim 3, wherein the friction linings (45, 47) have equal dimensions in the circumferential direction, the segmented disc has at least one segment having a smaller dimension in the circumferential direction than the corresponding dimension in the circumferential direction of said friction linings.

6. A clutch disc according to claim 3, wherein one (39) of the disc parts connected to the hub (1a) or the friction lining carrier (7a) is adjustable in relation to the hub (1a) or to the friction lining carrier (7a) respectively, in the circumferential direction steplessly or in adjustment angle steps which are smaller than the dimension in the circumferential direction of the friction linings (45, 47).

7. A clutch disc according to claim 3, wherein the friction linings (45, 47) are fitted on a hub flange (21a) protruding substantially radially outwardly from the hub (1a) and wherein the segmented disc (39) is guided non-rotatably but axially displaceably on a side disc (9a) of the friction lining carrier (7a) spaced axially from the hub flange (21a).

8. A clutch disc according to claim 1, wherein the friction damper comprises at least one pair of disc parts rotatable in relation to one another about the rotation axis and axially resiliently stressed towards one another, one of the disc parts being connected non-rotatably with the hub and the other disc part being connected non-rotatably with the friction lining carrier, wherein a friction ring rotatable about the rotation axis in relation to the two disc parts is arranged axially between the disc parts of the pair, the coefficient of friction of said friction ring being of different magnitude on axially opposite friction faces and said friction ring being selectively couplable non-rotatably with the disc part abutting on the friction face side of the lower coefficient of friction.

9. A clutch disc according to claim 8, wherein the disc part abutting on the friction face side of the lower coefficient of friction carries at least one bending tab couplable with the friction ring.

10. A clutch disc according to claim 9, wherein the hub comprises a substantially radially protruding hub flange and the friction lining carrier comprises side discs axially on both sides of the hub flange, and the bending tab is formed on the side discs.

11. A clutch disc according to claim 9, wherein the hub comprises a substantially radially protruding hub flange and the friction lining carrier comprises side discs axially on both sides of the hub flange, while the friction ring is arranged axially between the hub flange and a thrust ring arranged axially between the friction ring and one of the side discs and guided non-rotatably but axially displaceable on this side disc, and wherein the bending tab is formed on the thrust ring and the side disc comprises at least one opening through which the bending tab is axially accessible from the exterior.

* * * * *